Feb. 2, 1965    F. L. LAWRENCE    3,168,336
JOINT AND LOCK MECHANISM FOR TELESCOPING SPAR
Filed Oct. 26, 1960    2 Sheets-Sheet 1

INVENTOR.
FRANK L. LAWRENCE
BY
*Barnes & Seel*
ATTORNEYS

Feb. 2, 1965    F. L. LAWRENCE    3,168,336
JOINT AND LOCK MECHANISM FOR TELESCOPING SPAR
Filed Oct. 26, 1960    2 Sheets-Sheet 2

INVENTOR.
FRANK L. LAWRENCE
BY
ATTORNEYS

United States Patent Office 3,168,336
Patented Feb. 2, 1965

3,168,336
JOINT AND LOCK MECHANISM FOR
TELESCOPING SPAR
Frank L. Lawrence, North Surrey, British Columbia,
Canada, assignor, by mesne assignments, to Gearmatic
Co. Ltd., North Surrey, British Columbia, Canada, a
corporation of Canada
Filed Oct. 26, 1960, Ser. No. 65,166
5 Claims. (Cl. 285—81)

This invention relates to portable spars such, for example, as are employed in the logging industry as a support for the sheaves through which main and haulback lines pass, and pertains more especially to a portable spar of the telescoping type in which an upper section is telescopically associated with a lower section so as to give a shortened overall length, for greater ease in moving the same from one to another operating site, when the spar is swung from its operating erected position into an inoperative horizontal position.

For its principal object the invention aims to provide a telescoping spar having an improved joint between the upper and the lower sections, and a perfected means for releasably locking the two sections in their operating extended condition.

These and other objects and advantages of the invention will appear and be understood in the course of the following description and claims, the invention consisting in the novel construction and in the adaptation and combination of parts hereinafter described and claimed.

Figure 1:
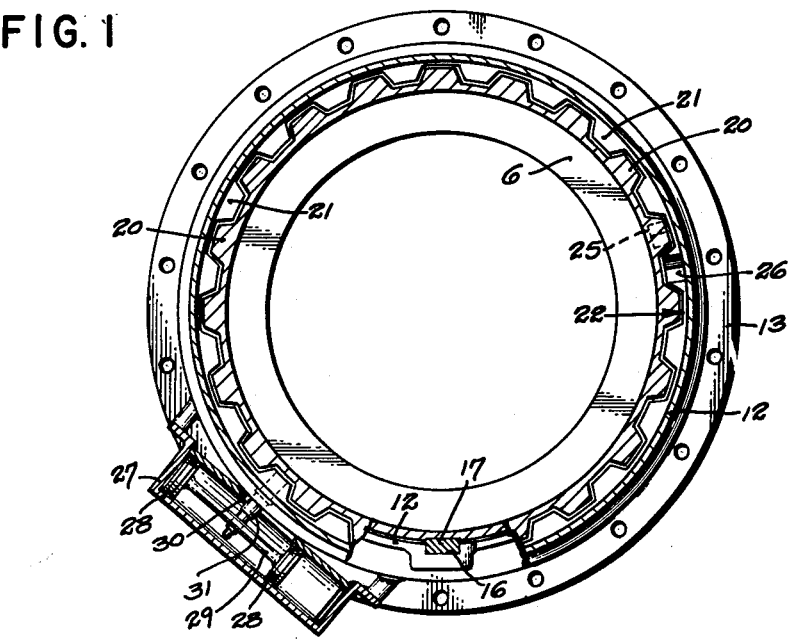
FIGURES 1 and 2 are horizontal sectional views illustrating a telescoping spar with joint and lock mechanism constructed to embody the preferred teachings of the present invention. Both views are drawn on the same jogged section line (2—2 of FIG. 3) and indicate the two extremes to which a revolubly mounted locking ring may be turned in moving the same between unlocked and locked positions.
Figure 2:
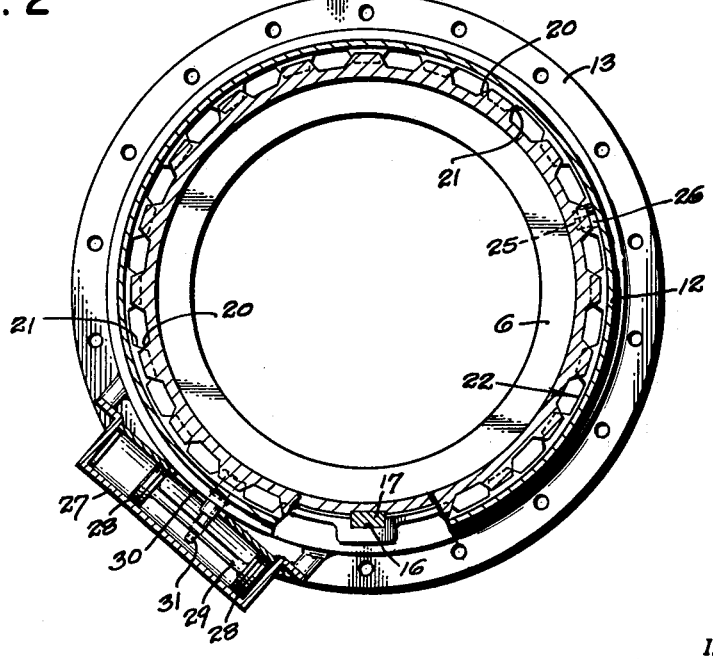
Figure 3:
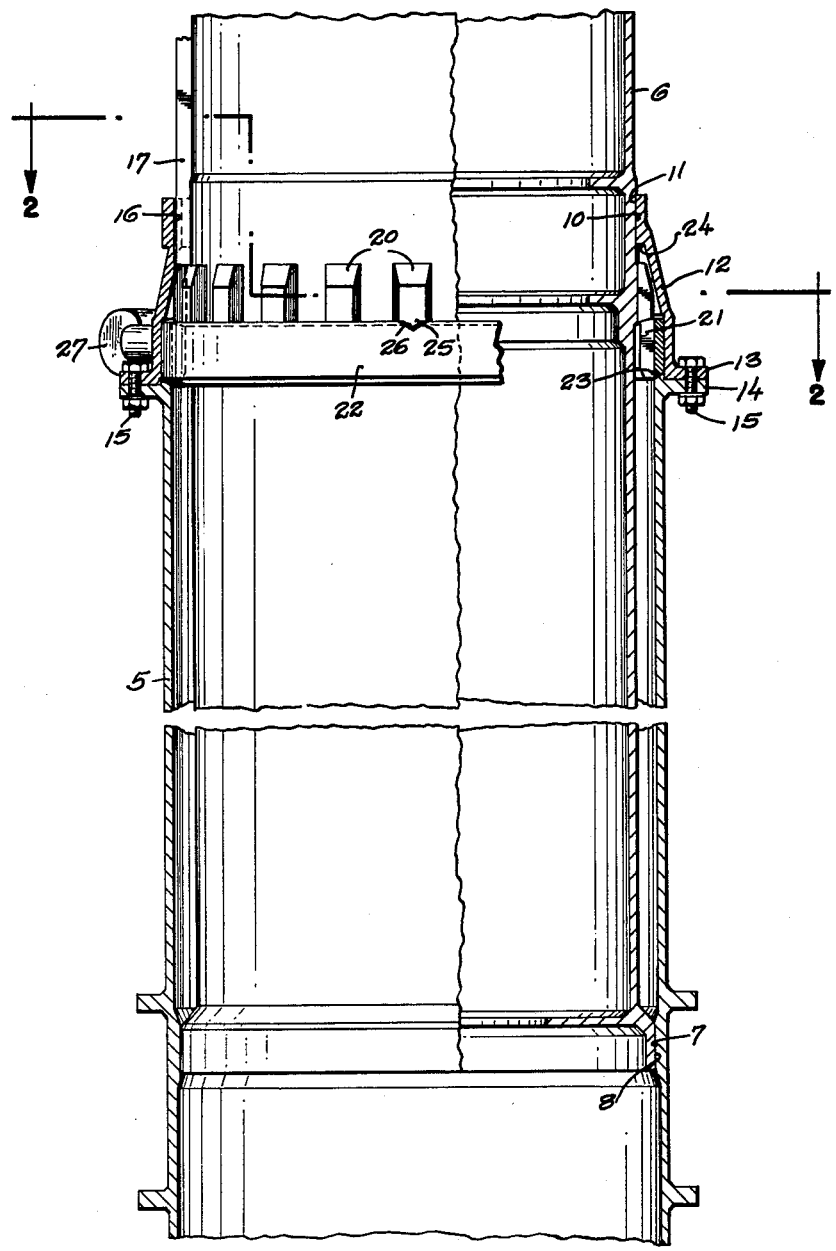
FIG. 3 is a transverse vertical sectional view with the parts positioned as in FIG. 2.

Referring to said drawings, the numeral 5 designates the lower section and 6 the upper section of a telescoping portable spar. The upper section fits within the lower section and is given substantial clearance throughout the greater portion of its slide motion, piloting at two vertically spaced points upon reaching the upper extreme of such motion. Both such pilot points provide close tolerance, say .020 diametral clearance. The lower pilot point is provided between a machined internal surface 7 of the lower section 5 and a machined external surface 8 of the upper spar section 6. The upper pilot point is provided between a machined external surface 10 of said upper section, and an internal surface 11 machined in the head end of a lock-ring housing 12 which is prolonged axially from the upper end of the lower spar section as a nose extension thereof. Flanges 13 and 14 accommodate bolts 15 for fixedly securing the housing to the lower section.

A key-way 16 is provided in said head end of the lock-ring housing and accommodates a key 17 which is welded to the upper spar section 6, the key extending from approximately the upper limit of the upper spar section to the lower end of the upper machined pilot surface 10. The key holds the two spar sections against relative rotation.

The lock mechanism of the present invention comprises a set of external teeth 20 solidly attached to the upper spar section 6 immediately below the upper pilot surface 10, and a complementing set of internal teeth 21 carried by a locking ring 22. The locking ring is permanently contained within the housing 12, being journaled for rotation upon a thrust face 23. In the upward vertical movement of the upper spar section, the external teeth 20 pass through the interstices between the internal teeth 21 into a housed position within the upper portion of the housing, being initially brought to bear against a limit stop 24. In this position the external teeth are elevated somewhat above said teeth 21 of the locking ring, whereupon the locking ring is given a partial turn of predetermined magnitude sufficient to bring the two sets of teeth into an in-line condition, and the upper spar section is then lowered so that the external teeth rest upon the internal teeth and pass the vertical load of the upper spar section to the thrust shoulder 23. One or more of he external teeth has a localizing V-shaped key 25 welded to the bottom end face. Said partial turn given to the locking ring brings the localizing key into registration with a mating socket 26 cut in the upper end face of the related internal tooth 21.

Power for the twist activation of the locking ring is provided by a double-acting piston working in an air cylinder 27. The air cylinder occupies a horizontal position anchored to the outside of the housing 12. The piston is comprised of two axially spaced heads 28 connected by a rod 29, and a shuttling radial arm 31 attached to this piston rod so as to move in concert therewith extends laterally through a horizontal slot 30 in the cylinder wall and a registering arcuate slot (not shown) in the wall of the housing 12, said rod having its inner end rooted to the locking ring.

In order to unlock the mechanism so as to lower the upper spar section it is necessary that the latter be first raised in a degree sufficient to bring the localizing key above the top edge of the locking ring, then turned in the predetermined degree prescribed by the shuttle-mounted piston, whereupon the lowering step may be performed in that the external teeth 20 have been brought into exact register with the interstices between the internal teeth 21.

The key 17 is aligned with one of the external teeth and has a width no wider than such tooth, hence is accommodated by a related one of the interstices, occurring between the internal teeth 21, as the two spar sections are telescoped by lowering and raising the upper section relative to the lower section.

It is believed that the construction and manner of operation of the present joint and lock mechanism will have been apparent from the foregoing detailed description of my now preferred illustrated embodiment. It will be understood that the spar is always brought to a vertical position for telescoping the same either to extend or contract its length, and that the spar is also set by its guy lines in a vertical position when in use. For simplicity in illustration I have deleted any showing of a means for telescoping the spar sections. In this respect the art of telescoping spars is well developed and the present improvements introduce no problems in that the hollow centers of the spar sections are unobstructed.

It is my intention that no limitations be implied and that the hereto annexed claims be given the broadest interpretation to which the employed language fairly admits.

What I claim is:

1. In a telescoping spar of a type which stands upright when in its operating position, in combination: a lower spar section provided adjacent its upper end with upwardly facing support means, an upper spar section received for telescoping slide movement within the lower section, a ring seated on said support means with said support means providing a thrust mounting therefor, means carried by the upper end of said lower spar section providing a journal mounting for said ring allowing the ring to turn about the center of the lower spar section as an axis, said ring including a set of spaced internal teeth formed on the inner radial perimeter thereof, a set of spaced external teeth carried on the outer radial perimeter of the upper section, said external teeth complementing said internal teeth and being positioned to lie immediately above the internal teeth when the spar is extended to its full height, the teeth of each of said two sets of teeth having a width such as to pass freely through the interstices which lie between the teeth of the other set, means carried by the upper end of the lower spar section for keeping the ring from being displaced upwardly, and means mounted on the upper end of said lower section for turning the ring to selectively position the internal teeth thereof in line either with said external teeth or the interstices therebetween.

2. A telescoping spar as claimed in claim 1 having interfitting means carried by the two spar sections holding said sections against relative rotation.

3. A telescoping spar as claimed in claim 1 having stop means carried by the upper end of the lower spar section for limiting the upward movement of said upper section to a limit point at which the external teeth are positioned a moderate distance above said internal teeth when the spar is fully extended.

4. A telescoping spar as claimed in claim 3 in which two vertically spaced portions of the external surface of the upper spar section have a piloting fit with two vertically spaced portions of the internal surface of the lower spar section from a comparatively loose to a close tolerance fit as the upper section is moved to said limit point when extending the spar.

5. A telescoping spar as claimed in claim 1 having interlock means carried by at least one of said external teeth and the corresponding internal tooth for positively holding the ring against turning motion relative to said external teeth when the upper section of the spar is lowered after the spar has been first extended to its full height and the ring turned to place the internal teeth thereof in alignment with the external teeth.

References Cited by the Examiner

UNITED STATES PATENTS

| | | | |
|---|---|---|---|
| 228,209 | 6/80 | Meier | 285—91 |
| 593,185 | 11/97 | Baird | 285—302 |
| 800,802 | 10/05 | Franquist | 285—412 |
| 1,128,474 | 2/15 | Martz | 285—91 |
| 1,174,788 | 3/16 | Winn | 114—90 |
| 1,663,755 | 3/28 | Gammeter. | |
| 1,915,014 | 6/33 | Carter. | |
| 2,347,721 | 5/44 | Tjaarda | 285—330 |
| 2,354,806 | 8/44 | Fletcher. | |
| 2,469,772 | 5/49 | Johnson | 166—89 |
| 2,483,396 | 10/49 | Benson. | |
| 2,916,143 | 12/59 | McConalogue. | |
| 3,135,363 | 6/64 | Bourassa | 189—26 |

CARL W. TOMLIN, *Primary Examiner.*

HUNTER C. BORNE, JR., *Examiner.*